US008672464B2

(12) United States Patent
Kato et al.

(10) Patent No.: US 8,672,464 B2
(45) Date of Patent: Mar. 18, 2014

(54) TREATMENT LIQUID FOR INK-JET RECORDING, INK SET, AND INK-JET RECORDING METHOD

(75) Inventors: Ryuji Kato, Kiyosu (JP); Hitomi Sadohara, Nagoya (JP); Noriaki Satoh, Nagoya (JP); Chisato Hayashi, Gifu (JP); Eiji Kawamura, Konan (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 163 days.

(21) Appl. No.: 13/075,358

(22) Filed: Mar. 30, 2011

(65) Prior Publication Data

US 2011/0242201 A1 Oct. 6, 2011

(30) Foreign Application Priority Data

Apr. 1, 2010 (JP) .................. 2010-085154

(51) Int. Cl.
*B41J 2/01* (2006.01)
(52) U.S. Cl.
USPC ............................... 347/96; 347/98; 347/100
(58) Field of Classification Search
USPC ................ 347/21, 28, 95–100; 523/160, 161; 106/31.13, 31.6
See application file for complete search history.

(56) References Cited

U.S. PATENT DOCUMENTS

| 4,890,126 A | 12/1989 | Hotomi |
| 5,609,671 A | 3/1997 | Nagasawa |
| 5,837,045 A | 11/1998 | Johnson et al. |
| 6,084,619 A | 7/2000 | Takemoto et al. |
| 6,261,349 B1 | 7/2001 | Nagai et al. |
| 6,261,353 B1 | 7/2001 | Doi et al. |
| 6,270,212 B1 | 8/2001 | Kusumi et al. |
| 6,286,953 B1 | 9/2001 | Takemoto et al. |
| 6,536,890 B1 | 3/2003 | Kato et al. |
| 6,540,314 B1 | 4/2003 | Sanada et al. |
| 6,637,859 B2 | 10/2003 | Williamson et al. |
| 6,863,391 B2* | 3/2005 | Tomioka et al. ............. 347/100 |
| 7,040,747 B2* | 5/2006 | Kubota et al. ................ 347/101 |
| 7,621,630 B2 | 11/2009 | Ito et al. |
| 2001/0035897 A1 | 11/2001 | Hayashi et al. |
| 2002/0044185 A1 | 4/2002 | Koitabashi et al. |
| 2002/0044187 A1 | 4/2002 | Koitabashi et al. |
| 2002/0077386 A1 | 6/2002 | Kurabayashi et al. |
| 2004/0070655 A1* | 4/2004 | Aoi et al. ..................... 347/100 |
| 2004/0244645 A1 | 12/2004 | Doi et al. |
| 2005/0012798 A1* | 1/2005 | Adachi et al. ................ 347/100 |

(Continued)

FOREIGN PATENT DOCUMENTS

| JP | 08-003498 | 1/1996 |
| JP | 08-020720 | 1/1996 |

(Continued)

OTHER PUBLICATIONS

EP Extended Search Report dated Oct. 7, 2011 corresponding Application No. 11160739.6.

(Continued)

*Primary Examiner* — Matthew Luu
*Assistant Examiner* — Rut Patel
(74) *Attorney, Agent, or Firm* — Banner & Witcoff, Ltd.

(57) ABSTRACT

Provided is a treatment liquid used for ink-jet recording including polyallylamine, water, and at least one acid selected from the group consisting of amidosulfonic acid, and itaconic acid.

6 Claims, 3 Drawing Sheets

(56) References Cited

U.S. PATENT DOCUMENTS

| | | |
|---|---|---|
| 2006/0023042 A1 | 2/2006 | Doi |
| 2006/0098068 A1 | 5/2006 | Hakamada et al. |
| 2006/0197814 A1* | 9/2006 | Doi ............... 347/100 |
| 2006/0002385 A1 | 10/2006 | Koga et al. |
| 2006/0238589 A1 | 10/2006 | Koga et al. |
| 2006/0238590 A1 | 10/2006 | Koga et al. |
| 2006/0293410 A1 | 12/2006 | Tokita et al. |
| 2007/0000229 A1 | 2/2007 | Koga |
| 2007/0022902 A1 | 2/2007 | Koga |
| 2007/0054981 A1 | 3/2007 | Yanagi et al. |
| 2007/0100023 A1 | 5/2007 | Burns et al. |
| 2007/0100024 A1 | 5/2007 | Gu et al. |
| 2007/0001868 A1 | 8/2007 | Koga et al. |
| 2007/0176995 A1 | 8/2007 | Kadomatsu et al. |
| 2007/0186812 A1 | 8/2007 | Koga et al. |
| 2007/0247504 A1 | 10/2007 | Koganehira et al. |
| 2007/0002528 A1 | 11/2007 | Sanada et al. |
| 2007/0252881 A1 | 11/2007 | Sanada et al. |
| 2008/0012887 A1 | 1/2008 | Maeno et al. |
| 2008/0239036 A1 | 10/2008 | Hattori |
| 2008/0241398 A1 | 10/2008 | Kato et al. |
| 2008/0246820 A1* | 10/2008 | Silverbrook ............... 347/63 |
| 2009/0229489 A1 | 9/2009 | Gu |
| 2009/0234067 A1 | 9/2009 | Kariya |
| 2009/0237442 A1 | 9/2009 | Yamanobe |
| 2009/0304927 A1 | 12/2009 | Kamibayashi et al. |
| 2010/0040782 A1 | 2/2010 | Arai et al. |
| 2011/0227996 A1* | 9/2011 | Ikoshi ............... 347/21 |
| 2012/0092413 A1* | 4/2012 | Kawamura ............... 347/21 |

FOREIGN PATENT DOCUMENTS

| | | |
|---|---|---|
| JP | 08-174997 | 7/1996 |
| JP | 08-193175 | 7/1996 |
| JP | 09-207424 | 8/1997 |
| JP | 10-129114 | 5/1998 |
| JP | 10-250216 | 9/1998 |
| JP | 11-115303 | 4/1999 |
| JP | 11-343435 | 12/1999 |
| JP | 2000-198222 | 7/2000 |
| JP | 2000-513396 | 10/2000 |
| JP | 2001-162817 | 6/2001 |
| JP | 2001-353861 | 12/2001 |
| JP | 2002-079740 | 3/2002 |
| JP | 2002-086707 | 3/2002 |
| JP | 2002-103783 | 4/2002 |
| JP | 2002-201385 | 7/2002 |
| JP | 2004-090456 A | 3/2004 |
| JP | 2004-359841 | 12/2004 |
| JP | 2006-241279 | 9/2006 |
| JP | 2007-179136 | 7/2007 |
| JP | 2007-230232 | 9/2007 |
| JP | 2007-261203 | 10/2007 |
| JP | 2008-213388 | 9/2008 |
| JP | 2008-230161 | 10/2008 |
| JP | 2008-246821 | 10/2008 |
| JP | 2008284826 A | 11/2008 |
| JP | 2009-515007 | 4/2009 |
| JP | 2009091528 A | 4/2009 |
| JP | 08-193175 | 10/2009 |
| JP | 2009-297924 | 12/2009 |
| JP | 2010-023266 A | 2/2010 |
| WO | 2007/053563 A2 | 5/2007 |

OTHER PUBLICATIONS

EP Extended Search Report dated Oct. 7, 2011, corresponding Application No. 11160737.0.

* cited by examiner

TREATMENT LIQUID FOR INK-JET RECORDING, INK SET, AND INK-JET RECORDING METHOD

CROSS-REFERENCE TO RELATED APPLICATION

This application claims priority from Japanese Patent Application No. 2010-085154 filed on Apr. 1, 2010. The entire subject matter of the Japanese Patent Application is incorporated herein by reference.

BACKGROUND

It has been proposed to use a treatment liquid, to which polyallylamine hydrochloride that has the capacity for aggregating pigment particles is added, separately from an ink for ink-jet recording for the purpose of improving image quality in ink-jet recording. However, there has been the possibility of causing corrosion of a metallic member of an ink-jet recording apparatus that is to be in contact with the treatment liquid.

SUMMARY

A treatment liquid used for ink-jet recording comprises polyallylamine, water, and at least one acid selected from the group consisting of nitric acid, amidosulfonic acid, and itaconic acid.

An ink set comprises a water-based ink for ink-jet recording (hereinafter, this may also be referred to simply as the "water-based ink" or "ink") and a treatment liquid. The water-based ink is a water-based ink comprising a pigment, water, and a water-soluble organic solvent; and the treatment liquid is the aforementioned treatment liquid.

An ink-jet recording method comprises a treatment step of applying the aforementioned treatment liquid to a recording medium and a recording step of recording by ejecting a water-based ink on the recording medium by an ink-jet method.

DETAILED DESCRIPTION

As described above, the treatment liquid is a treatment liquid that is used for ink-jet recording. The treatment liquid comprises polyallylamine, water, and at least one acid (hereinafter, this may also be referred to as the "specific acid") selected from the group consisting of nitric acid, amidosulfonic acid, and itaconic acid.

The polyallylamine has a capacity for aggregating pigment particles in a water-based ink, for example, when the treatment liquid and the water-based ink are brought into contact with each other on a recording medium. The use of the polyallylamine makes it possible to achieve the image quality improvement effect (for example, improvement of optical density (OD value) of a recorded image). For example, commercially available polyallylamine may be used. Examples thereof include "PAA®-15" and "PAA®-03" manufactured by Nitto Boseki Co., Ltd.; and the like.

The amount of the polyallylamine (solid content) to be added relative to the total amount of the treatment liquid is, for example, in the range from 1 wt % to 10 wt %, in the range from 1 wt % to 5 wt %, and in the range from 3 wt % to 5 wt %.

The water may be ion-exchange water or pure water. The amount of the water to be added to the total amount of the treatment liquid may be, for example, the balance of the treatment liquid, excluding other components.

The specific acids have capacity for adjusting the pH of the treatment liquid that is increased due to addition of polyallylamine, for example. The use of the specific acids makes it possible to achieve the image quality improvement effect (for example, improvement of chroma (C*) of a recorded image). Further, the use of the specific acids makes it possible to suppress or prevent corrosion of a metallic member of an ink-jet recording apparatus that is to be in contact with the treatment liquid. For example, in the case where the treatment liquid is ejected from an ink-jet head, the use of the specific acids makes it possible to suppress or prevent corrosion of the metallic member of the ink-jet head. Especially, corrosion of stainless is effectively suppressed or prevented. It is to be noted that, as in the case of Comparative Example 5 that will be described below, when a trivalent acid such as citric acid is used for adjusting the pH of the treatment liquid, aggregation occurs. In contrast, the specific acids do not cause aggregation in the treatment liquid. Among the specific acids, nitric acid may be used. The specific acid may be added to the treatment liquid in such a manner that the degree of neutralization of the polyallylamine by the specific acid is 9% or more and 100% or less. In other words, the amount of the specific acid relative to the polyallylamine may be adjusted in such a manner that the degree of neutralization of the polyallylamine by the specific acid is in the aforementioned range. When the degree of neutralization is 9% or more, for example, a treatment liquid having a higher image quality improvement effect may be obtained. Further, when the degree of neutralization is 100% or less, for example, the pH of the treatment liquid may be in the manageable range. The degree of neutralization may be in the range from 15% to 100% and in the range from 50% to 100%. The degrees of neutralization of the polyallylamine by nitric acid, amidosulfonic acid, and itaconic acid are calculated with the formulae (1) to (3), respectively. When one of the nitric acid, amidosulfonic acid, and itaconic acid is used alone, the degree of neutralization is the degree of neutralization of the acid used. When two or more of the three acids are used in combination, the degree of neutralization is the sum of the degrees of neutralization of the acids used. The pH of the treatment liquid may be in the range from 4 to 11, in the range from 5 to 10, and in the range from 5 to 8.

$$\text{Degree of neutralization of polyallylamine by nitric acid (\%)} = (\text{amount of nitric acid (wt \%)}/63(\text{molecular weight of nitric acid})) \times (57(\text{molecular weight of polyallylamine})/\text{solid content of polyallylamine (wt \%)}) \times 100 \quad (1)$$

$$\text{Degree of neutralization of polyallylamine by amidosulfonic acid (\%)} = (\text{amount of amidosulfonic acid (wt \%)}/97(\text{molecular weight of amidosulfonic acid})) \times (57(\text{molecular weight of polyallylamine})/\text{solid content of polyallylamine (wt \%)}) \times 100 \quad (2)$$

$$\text{Degree of neutralization of polyallylamine by itaconic} \\ \text{acid (\%)} = ((\text{amount of itaconic acid (wt \%)} \times 2) / \\ 130(\text{molecular weight of itaconic acid})) \times (57(\text{mo-} \\ \text{lecular weight of polyallylamine})/\text{solid content} \\ \text{of polyallylamine (wt \%)}) \times 100 \qquad (3)$$

The treatment liquid may further comprise a water-soluble organic solvent. A conventionally known water-soluble organic solvent may be used as the water-soluble organic solvent. Examples of the water-soluble organic solvent include polyalcohols, polyalcohol derivatives, alcohols, amides, ketones, ketoalcohols, ethers, nitrogen-containing solvents, sulfur-containing solvents, propylene carbonate, ethylene carbonate, 1,3-dimethyl-2-imidazolidinone, and the like. Examples of the polyalcohols include glycerin, ethylene glycol, diethylene glycol, propylene glycol, butylene glycol, hexylene glycol, triethylene glycol, polyethylene glycol, dipropylene glycol, tripropylene glycol, polypropylene glycol, trimethylolpropane, 1,5-pentanediol, 1,2,6-hexanetriol, and the like. Examples of the polyalcohol derivatives include ethylene glycol methyl ether, ethylene glycol ethyl ether, ethylene glycol-n-propyl ether, ethylene glycol-n-butyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. Examples of the alcohols include methyl alcohol, ethyl alcohol, n-propyl alcohol, isopropyl alcohol, n-butyl alcohol, sec-butyl alcohol, isobutyl alcohol, tert-butyl alcohol, benzyl alcohol, and the like. Examples of the amides include dimethylformamide, dimethylacetamide, and the like. Examples of the ketones include acetone and the like. Examples of the ketoalcohols include diacetone alcohol and the like. Examples of the ethers include tetrahydrofuran, dioxane, and the like. Examples of the nitrogen-containing solvents include pyrrolidone, 2-pyrrolidone, N-methyl-2-pyrrolidone, cyclohexylpyrrolidone, triethanolamine, and the like. Examples of the sulfur-containing solvents include thiodiethanol, thiodiglycol, thiodiglycerol, sulfolane, dimethyl-sulfoxide, and the like. The amount of the water-soluble organic solvent to be added relative to the total amount of the treatment liquid (the proportion of the water-soluble organic solvent in the treatment liquid) is not particularly limited. One of the water-soluble organic solvents may be used alone or two or more of them may be used in combination.

The treatment liquid may or may not comprise a coloring agent. In the case where the treatment liquid comprises a coloring agent, the amount of the coloring agent to be added may be an amount at the degree that does not affect a recorded image.

The treatment liquid may further comprise a conventionally known additive(s), if necessary. Examples of the additive include a surfactant, a pH adjuster, a viscosity modifier, a surface tension modifier, an antioxidant, a mildewproofing agent, and the like. Examples of the viscosity modifier include polyvinyl alcohols, celluloses, water-soluble resins, and the like.

The treatment liquid may be prepared, for example, by uniformly mixing polyallylamine, water, the specific acid, and optionally other added components by a conventionally known method.

Next, the ink set will be described. As described above, the ink set comprises a water-based ink for ink-jet recording and a treatment liquid. The water-based ink is a water-based ink comprising a pigment, water, and a water-soluble organic solvent; and the treatment liquid is the aforementioned treatment liquid.

Examples of the pigment include carbon blacks, inorganic pigments, organic pigments, and the like. Examples of the carbon blacks include furnace black, lamp black, acetylene black, channel black, and the like. Examples of the inorganic pigments include titanium oxide pigments, iron oxide pigments, carbon black pigments, and the like. Examples of the organic pigments include azo pigments such as azo lake pigments, insoluble azo pigments, condensed azo pigments, chelate azo pigments, and the like; polycyclic pigments such as phthalocyanine pigments, perylene and perynone pigments, anthraquinone pigments, quinacridone pigments, dioxazine pigments, thioindigo pigments, isoindolinone pigments, quinophthalone pigments, and the like; dye lake pigments such as basic dye lake pigments, acid dye lake pigments, and the like; nitro pigments; nitroso pigments; aniline black daylight fluorescent pigments; and the like. Further, other pigments may be used as long as they are dispersible to an aqueous phase. Examples of the pigments include C. I. Pigment Black 1, 6, and 7; C. I. Pigment Yellow 1, 2, 3, 12, 13, 14, 15, 16, 17, 55, 78, 150, 151, 154, 180, 185, and 194; C. I. Pigment Orange 31 and 43; C. I. Pigment Red 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blue 1, 2, 3, 15, 15:1, 15:2, 15:3, 15:4, 16, 22, and 60; C. I. Pigment Green 7 and 36; and the like.

The pigment may be a self-dispersible pigment. The self-dispersible pigment is a pigment in which at least one of hydrophilic functional groups such as a carbonyl group, a hydroxyl group, a carboxylic acid group, a sulfonic acid group, and a phosphoric acid group and their salts is introduced into a pigment particle directly or through other groups by a chemical bond, and therefore is dispersible to water without using a dispersant. As for the self-dispersible pigment, for example, self-dispersible pigments treated according to the methods described in JP8 (1996)-3498A, JP2000-513396A, JP2009-515007A, and the like may be used. For example, commercially available self-dispersible pigments may be used. Examples thereof include "CAB-O-JET® 200", "CAB-O-JET® 250C", "CAB-O-JET® 260M", "CAB-O-JET® 270Y", "CAB-O-JET® 300", "CAB-O-JET® 400", "CAB-O-JET® 450C", "CAB-O-JET® 465M", and "CAB-O-JET® 470Y" manufactured by Cabot Specialty Chemicals, Inc.; "BONJET® BLACK CW-2" and "BONJET® BLACK CW-3" manufactured by Orient Chemical Industries, Ltd.; "LIOJET® WD BLACK 002C" manufactured by TOYO INK MFG. CO., LTD.; and the like.

As a pigment used as a material of the self-dispersible pigment, either an inorganic pigment or an organic pigment may be used. Further, examples of the pigment suitable to perform the aforementioned treatment include carbon blacks such as "MA8" and "MA100" manufactured by Mitsubishi Chemical Corporation; "COLOR BLACK FW 200" manufactured by Evonik Degussa; and the like.

The amount of the pigment (solid content) to be added relative to the total amount of the water-based ink is not particularly limited and decided suitably according to, for example, a desired optical density, a desired color, or the like. The solid content of pigment is, for example, in the range from 0.1 wt % to 20 wt % and in the range from 0.5 wt % to 10 wt %.

The water-based ink may further comprise, for example, a dye(s) as a coloring agent in addition to the pigment.

The water used for the water-based ink may be ion-exchange water or pure water. The amount of the water to be added relative to the total amount of the water-based ink (the proportion of the water in the water-based ink) is, for example, in the range from 10 wt % to 90 wt % and in the range from 40 wt % to 80 wt %. The proportion of the water in the water-based ink may be, for example, the balance of the water-based ink, excluding other components.

Examples of the water-soluble organic solvent used for the water-based ink include a humectant and a penetrant. The humectant prevents a water-based ink from drying at a nozzle tip portion of an ink-jet head, for example. The penetrant adjusts a drying rate of a water-based ink on a recording medium, for example.

Examples of the humectant include, but not limited to, lower alcohols such as methyl alcohol, ethyl alcohol, n-propyl alcohol, isopropyl alcohol, n-butyl alcohol, sec-butyl alcohol, tert-butyl alcohol, and the like; amides such as dimethylformamide, dimethylacetamide, and the like; ketones such as acetone and the like; ketoalcohols such as diacetone alcohol and the like; ethers such as tetrahydrofuran, dioxane, and the like; polyalcohols such as polyalkylene glycols, alkylene glycols, glycerin, and the like; 2-pyrrolidone; N-methyl-2-pyrrolidone; 1,3-dimethyl-2-imidazolidinone; and the like. Examples of the polyalkylene glycols include polyethylene glycol, polypropylene glycol, and the like. Examples of the alkylene glycols include ethylene glycol, propylene glycol, butylene glycol, diethylene glycol, triethylene glycol, dipropylene glycol, tripropylene glycol, thiodiglycol, hexylene glycol, and the like. One of the humectants may be used alone or two or more of them may be used in combination. Among them, for example, the humectant may be polyalcohols such as alkylene glycols, glycerin, and the like.

The amount of the humectant to be added relative to the total amount of the water-based ink is, for example, in the range from 0 wt % to 95 wt %, in the range from 5 wt % to 80 wt %, and in the range from 5 wt % to 50 wt %.

Examples of the penetrant include glycol ethers. Examples of the glycol ethers include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. One of the penetrants may be used alone or two or more of them may be used in combination.

The amount of the penetrant to be added relative to the total amount of the water-based ink is, for example, in the range from 0 wt % to 20 wt %, in the range from 0.1 wt % to 15 wt %, and in the range from 0.5 wt % to 10 wt %.

The water-based ink may further comprise a conventionally known additive(s), if necessary. Examples of the additive include a surfactant, a pH adjuster, a viscosity modifier, a surface tension modifier, a mildewproofing agent, and the like. Examples of the viscosity modifier include polyvinyl alcohols, celluloses, water-soluble resins, and the like.

The water-based ink may be prepared, for example, by uniformly mixing the pigment, water, the water-soluble organic solvent, and optionally other added components by a conventionally known method, and then removing sediments with a filter or the like.

The ink set may be provided as an ink cartridge. For example, the ink cartridge comprises an ink storing portion and a treatment liquid storing portion. The water-based ink is stored in the ink storing portion and the treatment liquid is stored in the treatment liquid storing portion. The ink cartridge may comprise storing portions for water-based inks other than the aforementioned water-based ink.

The ink cartridge may be an ink cartridge assembly in which a water-based ink cartridge and a treatment liquid cartridge are formed separately. Alternatively, the ink cartridge may be a single-body ink cartridge in which an ink storing portion and a treatment liquid storing portion are formed integrally.

Next, an ink-jet recording apparatus used for ink-jet recording using the treatment liquid and the ink-jet recording method are explained.

The ink-jet recording using the treatment liquid may be performed with the ink-jet recording apparatus having the following configuration. That is, the ink-jet recording apparatus comprises a metallic member that is to be in contact with the treatment liquid. For example, an ink-jet head having a metallic member is mounted on the ink-jet recording apparatus, and the treatment liquid is ejected from the ink-jet head. Especially, in the case where the metallic member includes stainless, corrosion of stainless may efficiently be suppressed or prevented. The ink-jet recording includes recording of letters and images; printing; and the like.

In the ink-jet recording apparatus, the ink-jet head may also serve as a means for applying the treatment liquid. Further, in the ink-jet recording method, the treatment liquid may be applied to the recording medium by ejecting it by the ink-jet method in the treatment step. Since the ink-jet recording apparatus and the ink-jet recording method use the treatment liquid containing the specific acid, the image quality improvement effect (for example, improvement of chroma ($C^*$) of a recorded image) is achieved. Further, in the ink-jet recording apparatus, corrosion of the metallic member that is to be in contact with the treatment liquid is suppressed or prevented. For example, in the case where the treatment liquid is ejected from the ink-jet head, corrosion of the metallic member of the ink-jet head is suppressed or prevented. Especially, corrosion of stainless is effectively suppressed or prevented. In the ink-jet recording apparatus and the ink-jet recording method, application of the treatment liquid may be performed, for example, by a stamping method, a brushing method, or a rolling method. For example, in the case where the treatment liquid is applied with a roller, for example, corrosion of a metallic member of a passage through which the treatment liquid is supplied to the roller, a metallic member of a support member of the roller, and a metallic member of a drive member (for example, motor, gear) of the roller is suppressed or prevented. Especially, corrosion of stainless is effectively suppressed or prevented.

Figure 1:
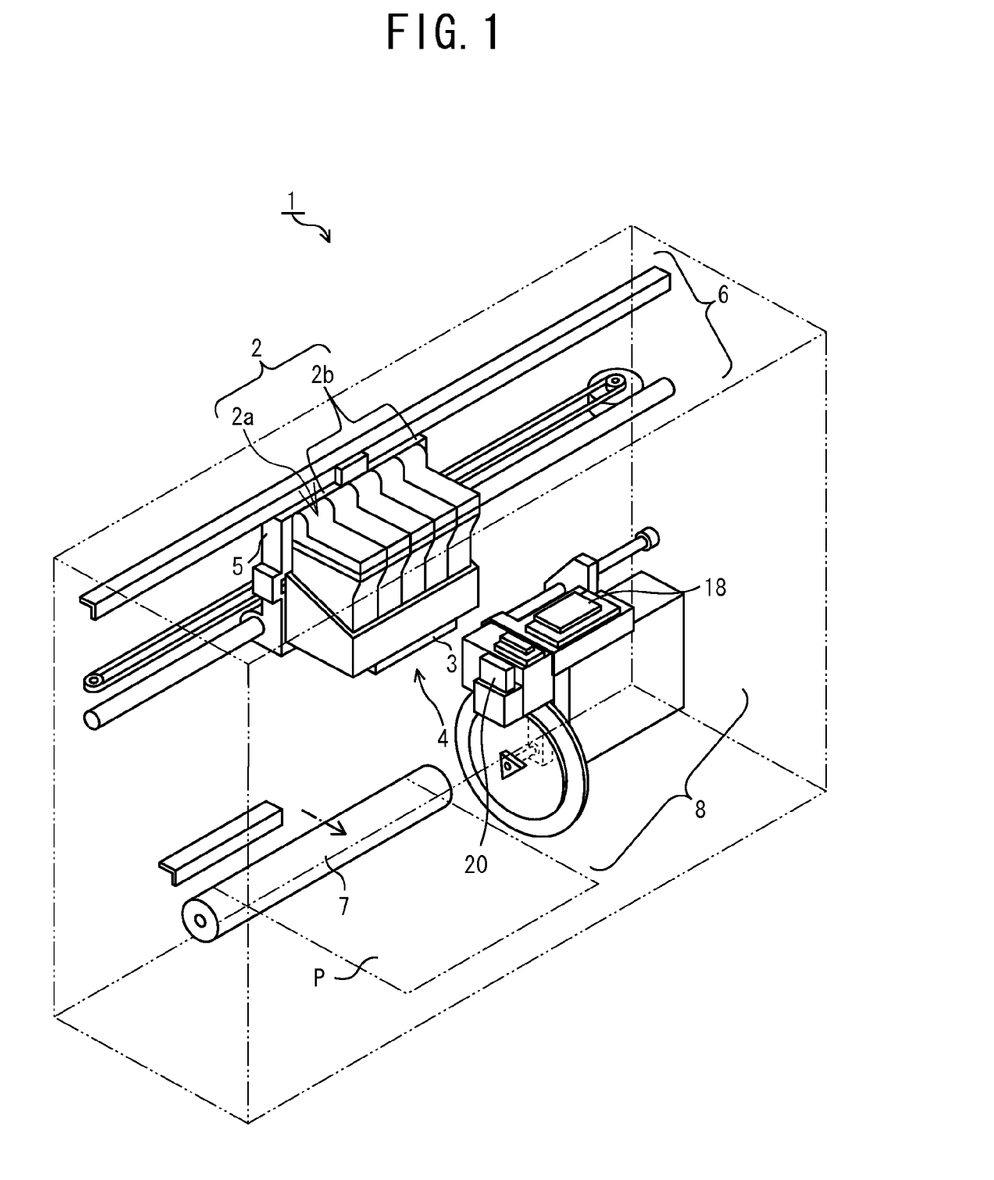
FIG. 1 is a schematic perspective view showing an example of the configuration of the ink-jet recording apparatus.

As shown in FIG. 1, an ink-jet recording apparatus 1 comprises an ink cartridge assembly 2, an ink-jet head 3 having a metallic member, a head unit 4, a carriage 5, a drive unit 6, a platen roller 7, and a purge unit 8 as main components.

The ink cartridge assembly 2 comprises a treatment liquid cartridge 2a and four water-based ink cartridges 2b. The treatment liquid cartridge 2a contains the treatment liquid. The four water-based ink cartridges 2b contain water-based inks of four colors, namely, yellow, magenta, cyan, and black, respectively. At least one of the four water-based inks is the water-based ink configuring the ink set.

The head unit 4 is provided with the ink jet head 3. The ink cartridge assembly 2 and the head unit 4 are mounted on the carriage 5. The drive unit 6 reciprocates the carriage 5 linearly. As the drive unit 6, for example, a conventionally known drive unit may be used (see JP 2008-246821A, for example). The platen roller 7 extends in the reciprocating direction of the carriage 5 and is arranged so as to face the ink-jet head 3.

The recording medium (for example, recording paper) P is fed from a paper feeding cassette (not shown) provided on a side of or underneath the ink-jet recording apparatus 1. The recording medium P is introduced between the ink-jet head 3 and the platen roller 7. The treatment liquid is applied (ejected) to the introduced recording medium P from the ink-jet head 3.

Figure 2A:
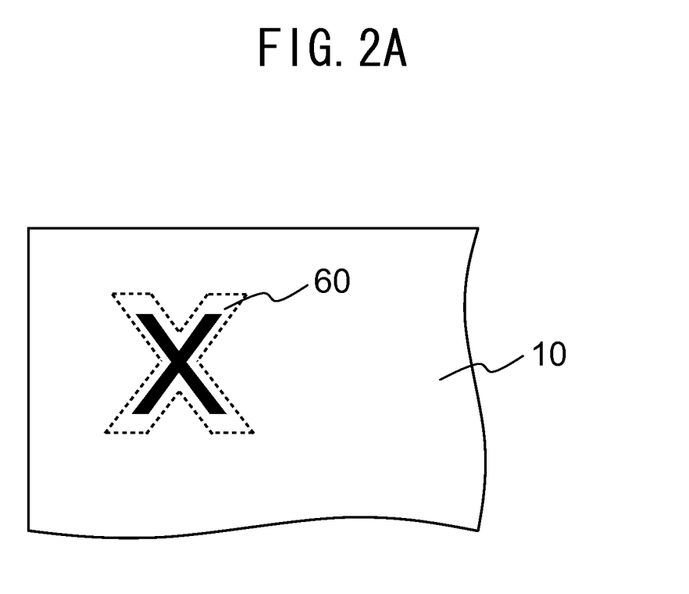
FIG. 2A is a view showing an example of recording by the ink-jet recording method.
Figure 2B:
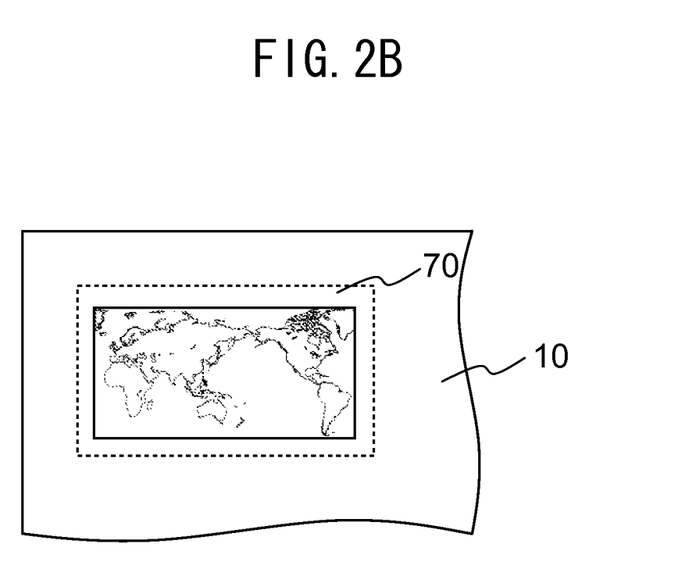
FIG. 2B is a view showing another example of recording by the ink-jet recording method.

The treatment liquid may be applied to the whole or a part of the recording surface of the recording medium. In the case where the treatment liquid is applied to a part of the recording surface of the recording medium, at least an area to be recorded, with a water-based ink, of the recording surface of the recording medium is a treatment liquid-applied area. In the case where the treatment liquid is applied to a part of the recording surface of the recording medium, the treatment liquid-applied area may be larger than the area to be recorded. For example, as shown in FIG. 2A, when the letter "X" is recorded on the recording medium P, the treatment liquid may be applied to form a treatment liquid-applied area 60 having a line width wider than that of the letter. Further, as shown in FIG. 2B, when an image is recorded on the recording medium P, the treatment liquid may be applied to form a treatment liquid-applied area 70 that is larger than the image.

Next, the water-based ink is ejected from the ink-jet head 3 on the treatment liquid that is applied on the recording medium P. The time between the ejection of the treatment liquid and the ejection of the water-based ink is not particularly limited. For example, the ejection of the treatment liquid and the ejection of the water-based ink may be performed in the same scanning operation.

As in the present embodiment, the ejection of the water-based ink may be performed after the ejection of the treatment liquid. This makes it possible to increase aggregation efficiency of pigment particles in the water-based ink. However, it is also possible that the treatment liquid is applied to the recording medium after the ejection of the water-based ink.

The recorded recording medium P is discharged from the ink-jet recording apparatus 1. In FIG. 1, illustration of a mechanism for feeding the recording medium P and a mechanism for discharging the recording medium P is omitted.

The purge unit 8 draws poor ink containing, for example, air bubbles trapped inside the ink-jet head 3. As the purge unit 8, for example, a conventionally known purge unit may be used (see JP 2008-246821A, for example).

On the platen roller 7 side of the purge unit 8, a wiper member 20 is provided adjacent to the purge unit 8. The wiper member 20 has a spatula shape, and wipes a nozzle-formed surface of the ink-jet head 3 accompanying the movement of the carriage 5. In FIG. 1, a cap 18 covers a plurality of nozzles of the ink-jet head 3, which returns to the reset position after the completion of recording, in order to prevent the treatment liquid and the water-based inks from drying.

In the ink-jet recording apparatus 1 of the present embodiment, the ink cartridge assembly 2 is mounted on one carriage 5. In the ink-jet recording apparatus, each cartridge of the ink cartridge assembly may be mounted on a separate carriage. Alternatively, the cartridges of the ink cartridge assembly may not be mounted on the carriage but may be arranged and fixed in the ink-jet recording apparatus. In such an embodiment, for example, the cartridges of the ink cartridge assembly are connected to the head unit mounted on the carriage via a tube or the like, and the treatment liquid and the water-based inks are supplied to the head unit from the cartridges of the ink cartridge assembly.

A serial-type ink-jet head is employed in the apparatus shown in FIG. 1. However, a line-type ink-jet head may be employed in the ink-jet recording apparatus.

EXAMPLES

Next, Examples are described together with Comparative Examples. However, the present invention is not limited to the following Examples.

(Preparation of Treatment Liquid)
Treatment liquids 1 to 16 were obtained by uniformly mixing their composition components (Tables 2 and 3).

(Preparation of Water-Based Ink)
An ink solvent was obtained by uniformly mixing the water-based ink composition components (Table 1) excluding CAB-O-JET® 300, CAB-O-JET® 260M, CAB-O-JET® 465M, and Pigment Red 122. Next, the ink solvent was added to each of CAB-O-JET® 300, CAB-O-JET® 260M, CAB-O-JET® 465M, and Pigment Red 122, and mixed uniformly. Thereafter, the resultant mixtures were filtered through a cellulose acetate type membrane filter (pore diameter: 3.00 μm) manufactured by Toyo Roshi Kaisha, Ltd. Thereby a water-based black ink for ink-jet recording and water-based magenta inks 1 to 3 for ink-jet recording were obtained.

TABLE 1

| | Water-based ink (unit: wt %) | | | |
| --- | --- | --- | --- | --- |
| | Black ink | Magenta ink 1 | Magenta ink 2 | Magenta ink 3 |
| CAB-O-JET ® 300 (*1) | 26.7 (4.0) | — | — | — |
| CAB-O-JET ® 260M (*2) | — | 30.0 (3.0) | — | — |
| CAB-O-JET ® 465M (*3) | — | — | 20.0 (3.0) | — |
| Pigment Red 122 | — | — | — | 3.0 |
| Glycerin | 27.0 | 31.0 | 31.0 | 28.0 |
| Diethylene glycol | 8.0 | 4.0 | 4.0 | 4.0 |
| Dipropylene glycol-n-propyl ether | 2.0 | 2.0 | 2.0 | 2.0 |
| Polyoxyethylene alkyl lauryl ether sodium sulfate (*4) | 1.0 | 1.0 | 1.0 | 1.0 |
| DISPERBYK ®-190 (*5) | — | — | — | 2.0 |
| Water | Balance | Balance | Balance | Balance |

(*1): self-dispersible pigment, manufactured by Cabot Specialty Chemicals, Inc., concentration of pigment = 15 wt %, numeric value inside parentheses shows solid content of pigment
(*2): self-dispersible pigment, manufactured by Cabot Specialty Chemicals, Inc., concentration of pigment = 10 wt %, numeric value inside parentheses shows solid content of pigment
(*3): self-dispersible pigment, manufactured by Cabot Specialty Chemicals, Inc., concentration of pigment = 15 wt %, numeric value inside parentheses shows solid content of pigment
(*4): average polymerization degree of oxyethylene = 12
(*5): polymer pigment dispersant, manufactured by BYK Japan KK Examples 1 to 12

Using the treatment liquids 1 to 12 in combination with each of the water-based black ink and water-based magenta inks 1 to 3, (a) optical density (OD value) of recorded image, (b) chroma (C*) of recorded image, and (c) formation of rust on metallic member were measured and evaluated according to the following methods.

Comparative Example 1

Using the water-based black ink and water-based magenta inks 1 to 3 without combining with the treatment liquids, (a) optical density (OD value) of recorded image, (b) chroma (C*) of recorded image, and (c) formation of rust on metallic member were measured and evaluated according to the following methods.

Comparative Examples 2 to 5

Using the treatment liquids 13 to 16 in combination with each of the water-based black ink and water-based magenta inks 1 to 3, (a) optical density (OD value) of recorded image, (b) chroma (C*) of recorded image, and (c) formation of rust on metallic member were measured and evaluated according to the following methods.

(a) Evaluation of Optical Density (OD Value)

Each of the treatment liquids of Examples and Comparative Examples was uniformly spread on plain paper (ALL IN ONE, manufactured by STAPLES INC.) with a barcoater (BARCOATER with rod No. 8, manufactured by YASUDA SEIKI SEISAKUSHO LTD). It is to be noted that application of the treatment liquid was not performed in Comparative Example 1.

Next, using a digital multi-function center DCP-330C which on an ink-jet printer mounted, manufactured by Brother Industries, Ltd., evaluation samples were prepared by recording black monochrome patches at 600 dpi×600 dpi resolution on the plain paper with the water-based black ink. The optical density (OD value) of each of the evaluation samples was measured with a spectrophotometer, Spectrolino (light source: $D_{50}$, observer: 2°, and filter: status T), manufactured by GretagMacbeth and evaluated according to the following evaluation criteria.

Evaluation Criteria for Optical Density (OD Value) Evaluation

AA: Optical Density (OD value) was 1.4 or more

A: Optical Density (OD value) was 1.3 or more and less than 1.4

B: Optical Density (OD value) was 1.2 or more and less than 1.3

C: Optical Density (OD value) was less than 1.2

(b) Evaluation of Chroma (C*)

Each of the treatment liquids of Examples and Comparative Examples was uniformly spread on plain paper (ALL IN ONE, manufactured by STAPLES INC.) with a barcoater (BARCOATER with rod No. 8, manufactured by YASUDA SEIKI SEISAKUSHO LTD). It is to be noted that application of the treatment liquid was not performed in Comparative Example 1.

Next, using the digital multi-function center DCP-330C, evaluation samples were prepared by recording magenta monochrome patches at 600 dpi×600 dpi resolution on the plain paper with the water-based magenta inks 1 to 3. The chroma (C*) of each of the evaluation samples was measured with a spectrophotometer, Spectrolino, manufactured by GretagMacbeth.

(c) Evaluation of Formation of Rust on Metallic Member

Flat-shaped test pieces (SUS 430 plate, surface area: 600 mm$^2$) were immersed in the treatment liquids of Examples and Comparative Examples under the following conditions (A) to (C). The test pieces were respectively taken out from the treatment liquids after a lapse of the following immersion time and were observed visually and with a microscope. The formation of rust on the metallic member was evaluated based on the results of the visual observation and microscope observation according to the following evaluation criteria.

(A) Amount of treatment liquids of Examples and Comparative Examples: 10 g (B) Temperature of treatment liquids: 60° C.

(C) Immersion time: 5 days

Evaluation Criteria for Formation of Rust on Metallic Member

G: Discoloration of SUS 430 and formation of rust on SUS 430 were not observed

NG: Discoloration of SUS 430 and formation of rust on SUS 430 were observed

Figure 3:
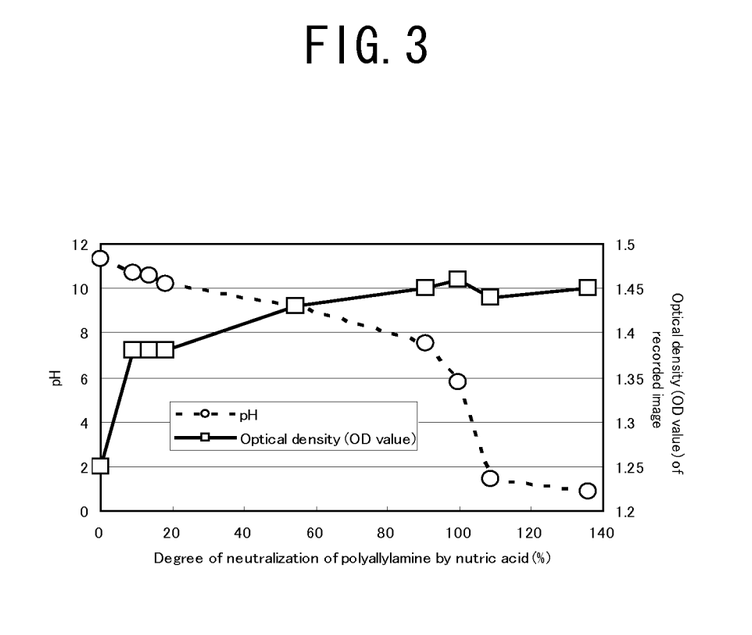
FIG. 3 is a graph showing the relation between the pH of the treatment liquid and the optical density (OD value) of the recorded image relative to the degree of neutralization of polyallylamine in the treatment liquids of Examples and Comparative Examples by nitric acid.
Figure 4:
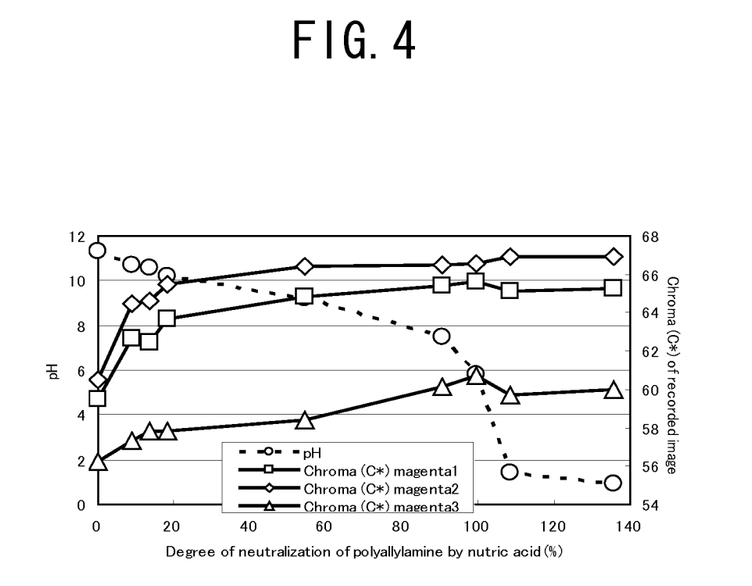
FIG. 4 is a graph showing the relation between the pH of the treatment liquid and the chroma (C*) of the recorded image relative to the degree of neutralization of polyallylamine in the treatment liquids of Examples and Comparative Examples by nitric acid.

The treatment liquids used in Examples 1 to 12 and the properties and evaluation results thereof are summarized in Table 2. Further, the treatment liquids used in Comparative Examples 2 to 5 and the properties thereof and the evaluation results of Comparative Examples 1 to 5 are summarized in Table 3. In Tables 2 and 3, the pH of each of the treatment liquids 1 to 16 was measured with a pH meter (F-54, manufactured by HORIBA, Ltd., 6367-10D was used as a pH electrode). Further, in Tables 2 and 3, the degree of neutralization of polyallylamine in each of the treatment liquids 1 to 16 by the acid was calculated by any one of the formulae (1) to (3). With respect to the treatment liquids used in Examples 2 to 9 and Comparative Example 3, the relation between the pH of the treatment liquid and the optical density (OD value) of the recorded image relative to the degree of neutralization of polyallylamine by nitric acid is shown in the graph of FIG. 3. Further, with respect to the treatment liquids used in Examples 2 to 9 and Comparative Example 3, the relation between the pH of the treatment liquid and the chroma (C*) of the recorded image relative to the degree of neutralization of polyallylamine by nitric acid is shown in the graph of FIG. 4.

TABLE 2

(unit: wt %)

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Treatment liquid | 1 | 2 | 3 | 4 | 5 | 6 | 7 | 8 | 9 | 10 | 11 | 12 |
| PAA ®-15 (*6) | 33.3 (5.0) | — | — | — | — | — | — | — | — | 20.0 (3.0) | 20.0 (3.0) | 20.0 (3.0) |
| PAA ®-03 (*7) | — | 15.0 (3.0) | 15.0 (3.0) | 15.0 (3.0) | 15.0 (3.0) | 15.0 (3.0) | 15.0 (3.0) | 15.0 (3.0) | 15.0 (3.0) | — | — | — |
| Polyethylene glycol 200 | 10.0 | 10.0 | 10.0 | 10.0 | 10.0 | 10.0 | 10.0 | 10.0 | 10.0 | 10.0 | 10.0 | 10.0 |
| Dipropylene glycol-n-propyl ether | 1.0 | 1.0 | 1.0 | 1.0 | 1.0 | 1.0 | 1.0 | 1.0 | 1.0 | 1.0 | 1.0 | 1.0 |
| MYDOL 10 (*8) | 1.0 | 1.0 | 1.0 | 1.0 | 1.0 | 1.0 | 1.0 | 1.0 | 1.0 | 1.0 | 1.0 | 1.0 |
| 60 wt % nitric acid | 8.3 | 0.5 | 0.75 | 1.0 | 3.0 | 5.0 | 5.5 | 6.0 | 7.5 | — | — | — |

TABLE 2-continued (unit: wt %)

| | | | Examples | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Amidosulfonic acid | | | — | — | — | — | — | — | — | — | — | 5.0 | — | — |
| Itaconic acid | | | — | — | — | — | — | — | — | — | — | — | 2.5 | 2.0 |
| Triethanolamine | | | — | — | — | — | — | — | — | — | — | 1.0 | — | — |
| Water | | | Balance | Balance | Balance | Balance | Balance | Balance | Balance | Balance | Balance | Balance | Balance | Balance |
| Physical property of treatment liquid | pH | | 7.3 | 10.7 | 10.6 | 10.2 | 9.2 | 7.5 | 5.8 | 1.4 | 0.9 | 7.8 | 9.1 | 9.5 |
| | Degree of neutralization | | 90% | 9% | 14% | 18% | 54% | 90% | 100% | 109% | 136% | 98% | 73% | 59% |
| Evaluation | Optical density (OD value) | Black ink | 1.41 | 1.38 | 1.38 | 1.38 | 1.43 | 1.45 | 1.46 | 1.44 | 1.45 | 1.21 | 1.31 | 1.30 |
| | | Evaluation | AA | A | A | A | AA | AA | AA | AA | AA | B | A | A |
| | Chroma (C*) | Magenta ink 1 | 63.26 | 62.67 | 62.41 | 63.65 | 64.82 | 65.42 | 65.63 | 65.14 | 65.27 | 59.65 | 61.18 | 59.81 |
| | | Magenta ink 2 | 64.20 | 64.60 | 64.59 | 65.51 | 66.42 | 66.52 | 66.59 | 66.92 | 66.94 | 61.75 | 62.63 | 61.58 |
| | | Magenta ink 3 | 61.82 | 57.29 | 57.81 | 57.83 | 58.38 | 60.15 | 60.74 | 59.73 | 60.01 | 58.78 | 60.40 | 58.95 |
| | Formation of rust on metallic member | | G | G | G | G | G | G | G | G | G | G | G | G |

TABLE 3

(unit: wt %)

| | | | Comparative Examples | | | | |
|---|---|---|---|---|---|---|---|
| | | | 1 | 2 | 3 | 4 | 5 |
| Treatment liquid | | | — | 13 | 14 | 15 | 16 |
| PAA ®-15 (*6) | | | | 33.3 (5.0) | — | 20.0 (3.0) | 20.0 (3.0) |
| PAA ®-03 (*7) | | | | — | 15.0 (3.0) | — | — |
| Polyethylene glycol 200 | | | | 10.0 | 10.0 | 10.0 | 10.0 |
| Dipropylene glycol-n-propyl ether | | | | 1.0 | 1.0 | 1.0 | 1.0 |
| MYDOL 10 (*8) | | | | 1.0 | 1.0 | 1.0 | 1.0 |
| 35 wt % hydrochloric acid | | | | — | — | 2.5 | — |
| Citric acid | | | | — | — | — | 2.0 |
| Triethanolamine | | | | — | — | 1.0 | — |
| Water | | | | Balance | Balance | Balance | Balance |
| Physical property of treatment liquid | pH | | — | 11.5 | 11.3 | 7.3 | Aggregated |
| | Degree of neutralization | | — | 0% | 0% | 46% | |
| Evaluation | Optical density (OD value) | Black ink | 1.04 | 1.25 | 1.25 | 1.33 | |
| | | Evaluation | C | B | B | A | |
| | Chroma (C*) | Magenta ink 1 | 53.41 | 59.52 | 59.52 | 62.10 | |
| | | Magenta ink 2 | 56.18 | 59.72 | 60.47 | 63.03 | |
| | | Magenta ink 3 | 53.97 | 53.96 | 56.24 | 60.50 | |
| | Formation of rust on metallic member | | — | G | G | NG | |

Footnotes of Tables 2 and 3
(*6): polyallylamine-unneutralized product (weight-average molecular weight: 15,000), manufactured by Nitto Boseki Co., Ltd., concentration of polyallylamine = 15 wt %, numeric values inside parentheses show solid content of polyallylamine
(*7): polyallylamine-unneutralized product (weight-average molecular weight: 3,000), manufactured by Nitto Boseki Co., Ltd., concentration of polyallylamine = 20 wt %, numeric values inside parentheses show solid content of polyallylamine
(*8): manufactured by Kao Corporation, concentration of decyl glucoside = 40 wt %

As summarized in Table 2, in Examples 1 to 12, the optical density (OD value) and chroma (C*) of the recorded image were improved as compared to Comparative Example 1 in which application of the treatment liquid was not performed. Further, in Examples 1 to 12, formation of rust on a metallic member was prevented. In Examples 1 to 7 and 10 to 12 in which the treatment liquids 1 to 7 and 10 to 12 having the degree of neutralization of polyallylamine by the acid of 100% or less were used, the pH of each of the treatment liquids was 5.8 or more, which was the manageable range. On the other hand, as summarized in Table 3, in Comparative Examples 2 and 3 in which adjustment of the pH that was increased due to addition of polyallylamine by the acid was not performed, the improvement of chroma (C*) of the recorded image was not sufficient depending on the type of magenta ink as compared to Examples 1 to 12, and the chroma (C*) of the recorded image was comparable to or slightly better than that in Comparative Example 1. In Comparative Example 4 in which the treatment liquid 15 in which the adjustment of the pH was performed by hydrochloric acid was used, formation of rust on a metallic member was observed. In Comparative Example 5 in which the treatment liquid 16 in which the adjustment of the pH was performed by citric acid was used, the measurement of physical property could not be performed and the evaluation of the optical density (OD value) of the recorded image, the evaluation of the chroma (C*) of the recorded image, and the evaluation of formation of rust on a metallic member could not be made because of occurrence of aggregation in the treatment liquid. As shown in FIG. 3, there was an inverse correlation between the pH of the treatment liquids of Examples and Comparative Examples and the optical density (OD value) of the recorded image. As shown in FIG. 4, there was also an inverse correlation between the pH of the treatment liquids of Examples and Comparative Examples and the chroma (C*) of the recorded image.

It will be obvious to those having skill in the art that many changes may be made in the above-described details of the particular aspects described herein without departing from the spirit or scope of the invention as defined in the appended claims.

What is claimed is:

1. A treatment liquid used for ink-jet recording, comprising:
   polyallylamine;
   water; and
   an acid selected from the group consisting of amidosulfonic acid, itaconic acid,
   and combinations thereof.

2. The treatment liquid according to claim 1, wherein a degree of neutralization of the polyallylamine by the acid is 9% or more and 100% or less.

3. The treatment liquid according to claim 1, wherein the treatment liquid is a treatment liquid that is applied to a recording medium in advance of ink-jet recording.

4. The treatment liquid according to claim 1, wherein the treatment liquid is ejected from an ink jet head having a metallic member.

5. An ink set comprising:
   a water-based ink for ink-jet recording; and
   a treatment liquid, wherein
   the water-based ink is a water-based ink comprising a pigment, water, and a water-soluble organic solvent, and
   the treatment liquid is the treatment liquid according to claim 1.

6. An ink-jet recording method comprising:
   a treatment step of applying a treatment liquid to a recording medium; and
   a recording step of recording by ejecting a water-based ink on the recording medium by an ink-jet method, wherein the treatment liquid according to claim 1 is used as the treatment liquid.

* * * * *

UNITED STATES PATENT AND TRADEMARK OFFICE
CERTIFICATE OF CORRECTION

PATENT NO. : 8,672,464 B2
APPLICATION NO. : 13/075358
DATED : March 18, 2014
INVENTOR(S) : Ryuji Kato et al.

Page 1 of 1

It is certified that error appears in the above-identified patent and that said Letters Patent is hereby corrected as shown below:

Title page

On Page 2, Column 2, under Foreign Patent Documents:
Please delete "JP 08-193175 10/2009" and replace with --JP 2009-220527 10/2009--

Signed and Sealed this
Twenty-seventh Day of October, 2015

Michelle K. Lee
*Director of the United States Patent and Trademark Office*